United States Patent Office 3,555,840
Patented Jan. 19, 1971

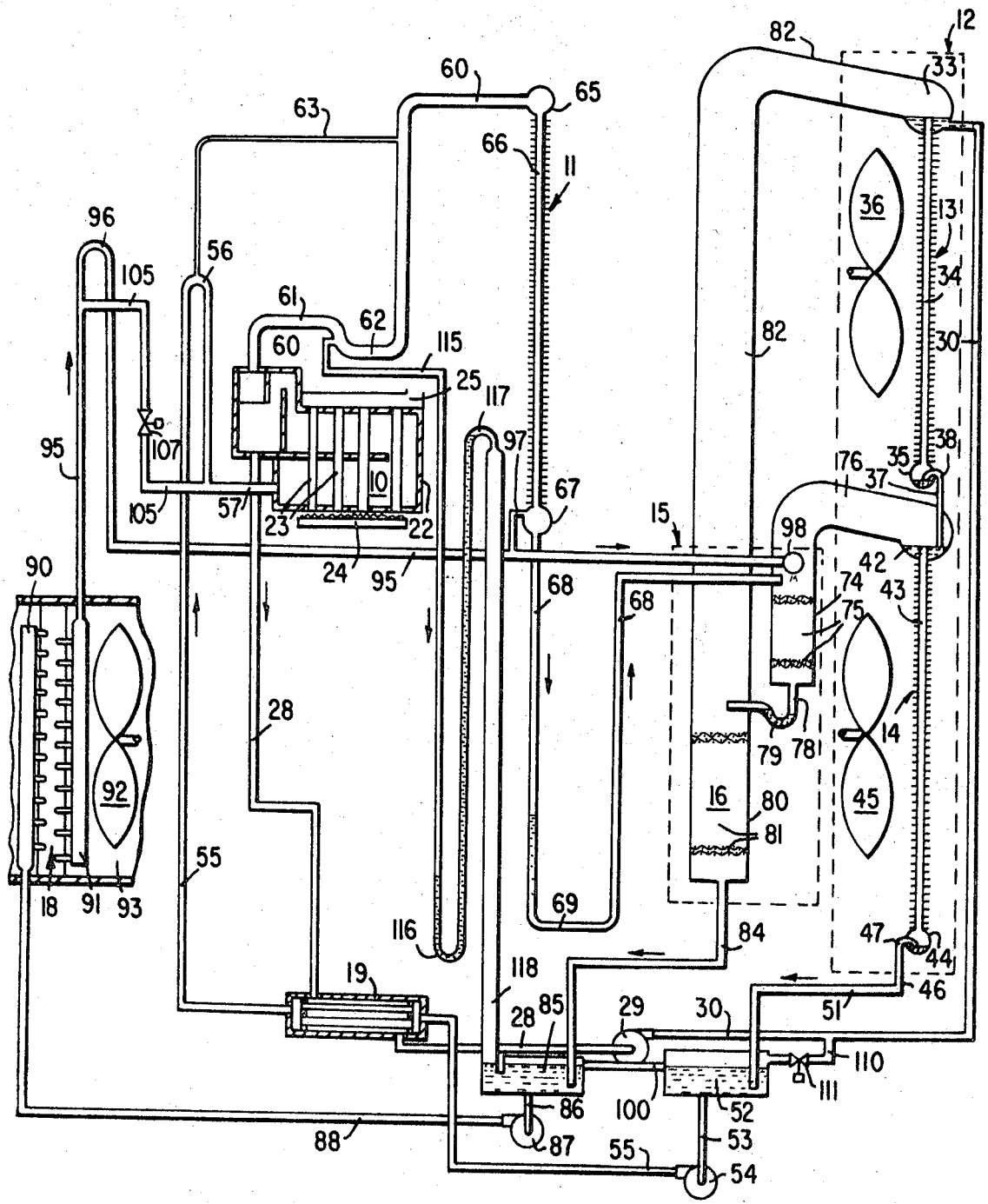

3,555,840
REFRIGERANT CONDENSATE DILUTION IN ABSORPTION REFRIGERATION SYSTEMS
Louis H. Leonard, Jr., De Witt, N.Y., assignor to Carrier Corporation, Syracuse, N.Y., a corporation of Delaware
Filed Dec. 18, 1968, Ser. No. 784,726
Int. Cl. F25b 15/06
U.S. Cl. 62—101
12 Claims

ABSTRACT OF THE DISCLOSURE

A heating and cooling system employing a two-stage adiabatic evaporator and a two-stage absorber having a counterflow relationship with the evaporator. A vapor pressure control passage is provided for controlling the vapor pressure of the refrigerant in the evaporator under low ambient operating conditions. A heating passage is provided to mix absorbent solution and refrigerant which is heated in the generator to supply heating at a desired location. A refrigerant condensate solution passage is provided to dilute the refrigerant condensate in the condenser liquid header with diluted refrigerant during periods of low ambient temperature operation in the cooling mode.

CROSS-REFERENCE TO RELATED APPLICATION

This application discloses features of the refrigeration system described in my co-pending application Ser. No. 784,725 filed concurrently herewith.

BACKGROUND OF THE INVENTION

It has been previously proposed by me to overcome the problems inherent in low ambient absorber temperature operation of an absorption refrigeration system, by diluting the refrigerant in the evaporator with absorbent solution, whereby the evaporation temperature of refrigerant is raised and the freezing temperature depressed. This arrangement permits highly satisfactory operation of an air-cooled absorption refrigeration system at ambient temperature far below that which could previously be tolerated in a system employing a lithium halide as an absorbent and water as a refrigerant.

When operating an absorption refrigeration system of the type described at low absorber ambient temperatures, the absorber vapor pressure may decrease below the freezing point of pure water. In the system described, the absorbent concentration at an absorber temperature of 55° F. may be about 36 percent lithium bromide by weight, which results in absorber dew point of about 32° F. At any absorber temperature below 55° F., the absorber dew point will be below the freezing temperature of pure water. The refrigerant in the evaporator will not freeze because it is always diluted with sufficient absorbent solution to raise its evaporation temperature to about 44° F. However, there is the possibility of flash-freezing of the pure refrigerant condensate when it is introduced into the evaporator under these conditions. The ice formed by flash-freezing of the condensate may clog the evaporator and hinder its performance. There is also the possibility of freezing and bursting the evaporator end of the refrigerant condensate passage, which may cause injury to the machine. Furthermore, during periods of operation of the refrigeration system at ambient temperatures below the freezing point, ice may form in the refrigerant condensate header as well as the condensate passage, causing the passage to burst. Such damage may permit air to leak into the system, which renders the machine incapable of providing refrigeration and causes corrosion of its metal parts.

Accordingly, it is a principal feature of this invention to provide a refrigeration method and apparatus which is capable of operating at low absorber ambient and condenser temperatures.

SUMMARY OF THE INVENTION

An absorption refrigeration system having a generator, a condenser, an absorber, and an evaporator is arranged to provide refrigeration. A refrigerant vapor pressure control passage is provided for diluting the refrigerant in the evaporator with absorbent salt under conditions of low ambient absorber temperature.

In accordance with this invention, a refrigerant condensate dilution passage is provided for passing diluted refrigerant from the evaporator to the condensate header of the condenser during those periods of operation when the refrigerant in the evaporator is diluted with absorbent salt. Consequently, under conditions of low absorber ambient temperatures, the refrigerant condensate passing into the evaporator from the condenser is diluted with absorbent salt to an extent sufficient to prevent freezing of the refrigerant in the evaporator or in the condensate passage.

BRIEF DESCRIPTION OF THE DRAWING

The drawing is a schematic flow diagram, partially in cross-section, of a heating and cooling system having a refrigerant condensate dilution passage in accordance with this invention showing certain liquid levels in the cooling mode of operation.

DESCRIPTION OF THE PREFERRED EMBODIMENT

This invention will be described with respect to a preferred embodiment wherein a two-stage adiabatic refrigerant evaporator and a two-stage air-cooled absorber are employed. However, this invention may be employed in systems having any number of either adiabatic or non-adiabatic evaporator stages.

The preferred refrigerant is water and the preferred absorbent is an aqueous solution of lithium bromide, although other absorbent-refrigerant combinations, especially those including a lithium halide salt, may be employed instead. As used herein, a concentrated solution of lithium bromide which is strong in absorbing power will be referred to as "strong" solution and a dilute solution of lithium bromide which is weak in absorbing power will be referred to as "weak" solution. "Refrigerant" as used herein includes pure water, which may be referred to as "concentrated refrigerant," and water having lithium bromide therein, which may be referred to as "dilute refrigerant." A heat transfer promoting additive, such as 2-ethyl-n-hexanol, may be added to the absorbent solution.

Referring to the drawing, the system comprises a generator 10, a condenser 11, an absorber 12 having a low pressure stage 13 and a high pressure stage 14, an adiabatic evaporator 15 having a low temperature stage 16 and a high temperature stage 17, an air conditioning heat exchanger 18 and a solution heat exchanger 19. Heat exchanger 18 provides sensible heat exchange between cold liquid refrigerant and air being conditioned when the system is connected to provide refrigeration. In such operation, heat exchanger 18 functions as a heat absorbing heat exchanger.

Generator 10 comprises a shell 22 having a plurality of fire tubes 23 extending therethrough. Fuel burner 24 discharges hot gas through fire tubes 23 into flue gas collector 25. Other types of generators, such as those employing steam or hot water as a heating fluid, may be alternatively utilized.

Weak absorbent solution is supplied to generator 10 and boiled therein to concentrate the solution in the cooling mode of operation. The resulting strong absorbent solution passes through strong solution passage 28 and the shell side of solution heat exchanger 19 to strong solution pump 29. The strong solution is pumped through strong solution passage 30 to low pressure vapor header 33 disposed at the top of low pressure absorber stage 13.

Low pressure absorber stage 13 comprises a plurality of vertically disposed finned absorber heat exchange tubes 34 connected at their upper ends by a low pressure vapor header 33 and at their lower ends by a low pressure liquid header 35. Strong solution overflows the open upper ends of absorber tubes 34 and passes downwardly along the interior surface of the absorber tubes while absorbing refrigerant vapor therein. The heat of the absorption process is rejected to ambient air passed over the exterior surfaces of absorber tubes 34 by fan 36. The absorbent solution is somewhat diluted by absorption of refrigerant vapor in tubes 34, so that the solution collected in low pressure liquid header 35 is of intermediate concentration. The intermediate solution passes through siphon tube 37 having an upwardly arched portion 38 into high pressure vapor header 42 of high pressure absorber stage 14.

High pressure absorber stage 14 comprises a plurality of finned vertical absorber heat exchanger tubes 43 joined at their upper ends by high pressure vapor header 42 and at their lower ends by high pressure liquid header 44. Intermediate absorbent solution overflows the upper open ends of absorber tubes 43 and passes downwardly along the interior surfaces of the absorber tubes while refrigerant vapor is being absorbed therein. The heat of the absorption process is rejected from high temperature absorber stage 14 to ambient air passed over the exterior surfaces of absorber tubes 43 by fan 45.

Absorbent solution passing downwardly through absorber tubes 43 is further diluted by the absorption of refrigerant vapor therein so that the absorbent solution collected in high pressure liquid header 14 is weak in absorbing power. The weak solution passes from the low pressure liquid header 44 through a siphon tube 46 having an upwardly arched portion 47 through weak solution passage 51 into weak solution sump 52. The weak solution then passes from weak solution sump 52 through weak solution passage 53 to weak solution pump 54. The weak solution is then pumped through weak solution passage 55 and the interior tubes of solution heat exchanger 19 through an upwardly extending loop 56, and weak solution passage 57 into generator 10 for reconcentration.

Refrigerant vapor is formed in generator 10 by the boiling of absorbent solution. This refrigerant vapor passes from generator 10 to condenser 11 through refrigerant vapor passage 60. Refrigerant vapor passage 60 has an upwardly extending loop 61 and a downwardly extending loop or trap 62 therein, which are free of liquid in the cooling mode. A vent line 63 vents the upper portion of loop 56 to the condenser pressure in passage 60.

Refrigerant condenser 11 comprises a plurality of vertical finned tubes 66 connected at their upper ends by refrigerant vapor header 65 and at their lower ends by refrigerant condensate header 67. Preferably, condenser 11 is located to receive air passing over the tubes in absorber 12 in order to utilize the absorber fans for passage of cooling air over the condenser. The refrigerant condensate formed in condenser 11 passes from header 67 through condensate passage 68 having a downwardly extending loop or trap 69 into high temperature evaporator stage 17 of adiabatic refrigerant evaporator 15.

High temperature evaporator stage 17 comprises a shell 74 having packing material 75 therein. A vapor passage 76 extends between high temperature evaporator stage 17 and vapor header 42 of high pressure absorber stage 14. A small quantity of refrigerant is evaporated from refrigerant passing through evaporator stage 17, thereby flash-cooling the remaining refrigerant. The cooled refrigerant passes from high temperature evaporator stage 17 to low temperature evaporator stage 16 through refrigerant passage 78 having a downwardly extending trap 79.

Low temperature evaporator stage 16 comprises a shell 80 having packing material 81 therein and a refrigerant vapor passage 82 communicating with vapor header 33 of low pressure absorber 13. As in the preceding stage, a small quantity of refrigerant is evaporated in low temperature evaporator stage 16 which results in flash-cooling the remainder of refrigerant passing therethrough. In all, only about one percent of the total refrigerant flowing through adiabatic evaporator 15 need be evaporated to satisfactorily flash-cool the remaining ninety-nine percent. A conventional single or multi-stage evaporator having a heat absorbing heat exchanger 18 included therein may be alternatively employed.

The cold refrigerant then passes from low temperature evaporator stage 16 through refrigerant passage 84 into refrigerant sump 85. The cold refrigerant passes from sump 85 through refrigerant passage 86 to pump 87 and is pumped through passage 88 to inlet header 90 of heat absorbing heat exchanger 18. Heat exchanger 18 may comprise an air conditioning fan-coil unit having an inlet header 90, an outlet header 91 and a fan 92 for passing air to be conditioned through the fan-coil unit located in duct 93. Heat exchanger 18 passes cold liquid refrigerant in heat exchange relation with the air passing thereover to cool the air which constitutes a refrigeration load in the cooling mode of operation. After absorbing heat from the air being cooled, the warmed liquid refrigerant passes through refrigerant passage 95 having an upwardly extending loop 96 and restricted spray nozzle 98 back to high temperature evaporator stage 17 of adiabatic evaporator 15 for recooling of the refrigerant.

A refrigerant concentration and vapor pressure control passage 100 extends between sumps 85 and 52 as shown in the drawing. This passage serves to adjust the concentration and vapor pressure of refrigerant and absorbent solution in the system under various operating conditions as explained in Leonard application Ser. No. 784,725.

A heating passage 105 communicates with passage 95 at a point below the top of upwardly arched loop 96. A mode control valve 107 is disposed in passage 105 which communicates at its other end with generator 10 through passage 57. Another heating passage 110 having a mode control valve 111 therein communicates between discharge of solution passage 30 and absorbent sump 52. A third heating passage 115 has an upper end connected between upwardly arched portion 61 and downwardly arched portion 62 of passage 60. Passage 115 has a downwardly extending loop 116 and an upwardly extending loop 117 therein. The downward leg 118 of upwardly extending loop 117 is connected to refrigerant sump 85 and is of larger diameter than the legs of loop 116 to prevent siphoning of loop 116.

When the system is in the cooling mode of operation, mode control valves 107 and 111 are closed and the liquid levels are approximately as shown in the drawing. Loop 116 is filled with sufficient liquid to balance the pressure different between generator 10 and refrigerant sump 85 to prevent passage of vapor therebetween. At or above design ambient absorber temperature, the refrigerant circulated through evaporator 15 and heat exchanger 18 is preferably substantially pure water and the strong absorbent solution concentration is preferably about 64.5% lithium bromide by weight.

To switch from the cooling mode of operation to the heating mode, control valves 107 and 111 are opened. Operation of pumps 54 and 29, and fans 36 and 45, is discontinued. Opening of valve 107 causes the fluid passing through passage 95 from heat exchanger 18 to be diverted into passage 105 because passage 105 and connecting passage 57 is below the top of loop 96 which is above the top of loop 61. Generator 10 and loops 61 and 62 are flooded with a mixture of refrigerant and absorbent solution by pump 87. The liquid level in passage 60 is below the junction of vent line 63 and below the top of loop 96. All of the refrigerant and absorbent solution in the system is mixed together to form a heating solution when the system is in the heating mode.

A major portion of the heated solution (90%) passes upwardly through loop 61 into heating passage 115. The level of the heated solution is above the level of upwardly extending loop 117 and it will flow by gravity through passage 115 through downwardly extending leg 118 into refrigerant sump 85. The heated solution passes from refrigerant sump 85 through the heat exchanger 18. A minor portion (10%) of the solution heated in generator 10 continues to pass downwardly through passage 28, the shell side of heat exchanger 19, through inoperative pump 29, passages 30 and 110, into absorbent sump 52, and through control passage 100 into refrigerant sump 85, from which it passes to heat exchanger 18, as previously described.

When it is desired to terminate heating and return to the cooling mode of operation, mode control valves 107 and 11 are closed. Pumps 54 and 29, and fans 36 and 45 are again energized. Closing of valve 107 terminates direct flow of solution from heat exchanger 18 to generator 10. Instead, solution is pumped from heat exchanger 18, through upwardly extending loop 96 and passage 95, and serially through high temperature evaporator 17 and low temperature evaporator 16 of adiabatic evaporator 15. The solution in generator 10 is heated to the boiling temperature to concentrate the solution. The level of solution in the generator drops so that vapor passage 60 is free of liquid and loop 116 is sealed but no longer passes solution.

The volume of strong absorbent solution passing to sump 52 will decrease as refrigerant is boiled from it in the generator, and the level of solution in sump 52 will tend to drop. Conversely, the quantity of refrigerant passing through evaporator 15 will increase due to the refrigerant added to the refrigerant circuit from condenser 11, and the level of refrigerant in sump 85 will tend to rise. When the level of refrigerant in sump 85 tends to exceed the level of absorbent solution in sump 52, diluted refrigerant will flow through refrigerant reconcentration and vapor pressure control passage 100 into absorbent sump 52 to balance the liquid levels in the two sumps. At absorber ambient temperature above design conditions, diluted refrigerant will continue to be bled from sump 85 into sump 52 until the refrigerant has been substantially concentrated and the absorbent solution has been concentrated to the desired full-load design operating concentration.

If the temperature of air passed over absorber 12 is less than the design temperature, the process of concentrating the absorbent solution and the refrigerant will stop at some intermediate concentration where an equilibrium is reached between absorber capacity and refrigeration demand. From then on, the concentration of absorbent and refrigerant will adjust itself to provide a variable vapor pressure effect which just balances refrigeration load against absorber capacity.

Upon a drop in ambient absorber temperature, the level of weak solution in sump 52 tends to increase above the level of refrigerant in sump 85 and absorbent solution will begin to flow from sump 52 through vapor pressure control passage 100 into the refrigerant sump 85. This passage of absorbent solution into the refrigerant sump will dilute the refrigerant being circulated through heat exchanger 18 to evaporator 15 with absorbent salt until the evaporation temperature in the evaporator rises back to the desired design evaporator temperature at which the refrigeration load just balances the absorber capacity.

Conversely, if the absorber ambient temperature rises, the level of solution in sump 52 tends to drop below the level of refrigerant in sump 85 and diluted refrigerant is bled through passage 100 to generator 10 via lines 55 and 57. Pure refrigerant condensate from condenser 11 is passed back to evaporator 15 and concentrated absorbent solution is passed from the generator back to the absorber circuit. Eventually, the system will concentrate both the absorbent and the refrigerant until the refrigeration load and absorber capacity balance each other or until the refrigerant is concentrated to substantially pure water.

In accordance with this invention, there is provided a refrigerant condensate dilution passage 97 connected between refrigerant passage 95 and refrigerant condensate header 67 of condenser 11. During operation of the system in the cooling mode, a small quantity of refrigerant is continuously bled from passage 95 into condensate header 67. Refrigerant passage 97 is preferably restricted to meter a predetermined desired quantity of refrigerant into the condensate header. Spray nozzle 98 provides sufficient restriction to assure that refrigerant is continuously bled into header 67 through passage 97.

During periods of operation of the refrigeration system at low absorber ambient temperature, the vapor pressure of the absorbent solution in absorber 12 may drop below that corresponding to the freezing temperature of pure water. When the absorber temperature is about 55° F., the concentration of absorbent solution in the absorber will be about 54.5 percent lithium bromide and the refrigerant concentration will be about 63 percent water. Under these conditions, the dew point in the absorber is about 32° F. At any absorber temperature below 55° F., the absorber dew point will be below the freezing point of pure water. The refrigerant will not freeze in the evaporator because it is diluted with absorbent solution; however, the condensate from condenser 11 would freeze if introduced into the evaporator in undiluted state.

Bleeding a small quantity of diluted refrigerant through condensate dilution passage 97 will cause some absorbent salt to be added to the pure refrigerant condensate passing to evaporator through condensate passage 68. By properly sizing passage 97, it is possible to prevent freezing of the condensate by diluting it with sufficient absorbent to decrease its freezing temperature below the dew point in absorber 12. Accordingly, at any time during operation of the system, when refrigerant passing through heat exchanger 18 is diluted, there will be a corresponding dilution of the refrigerant condensate in passage 68. At times when the refrigerant is not diluted, it will not be necessary to dilute the condensate because the absorber will be operating at a dew point above freezing.

During the heating mode of operation, loop 96 will drain some absorbent into condensate header 67 to provide some winter freeze protection for condensate line 68 providing that the system is operated to assure the presence of diluted refrigerant in passage 95.

While a preferred embodiment of the invention has been described for purposes of illustration, it will be appreciated that the invention may be otherwise embodied within the scope of the following claims.

I claim:
1. An absorption refrigeration system comprising:
    (A) a generator for boiling absorbent solution to concentrate said solution;

(B) a condenser for condensing refrigerant vapor formed in said generator;
(C) An evaporator for evaporating refrigerant condensed in said condenser to provide cooling;
(D) an absorber for absorbing refrigerant vapor formed in said evaporator into absorbent solution concentrated in said generator;
(E) condensate passage means for passing refrigerant condensate from said condenser to said evaporator; and
(F) condensate dilution passage means connected with said condensate passage means for diluting condensate passing through said condensate passage means prior to discharge of the condensate into said evaporator to vary the vapor pressure of the refrigerant condensate in response to a condition of operation of said system thereby inhibiting freezing of refrigerant during said condition of operation of said system.

2. An absorption refrigeration system as defined in claim 1 wherein said condensate dilution means comprises passage means for diluting said refrigerant condensate with absorbent solution.

3. An absorption refrigeration system as defined in claim 1 including refrigerant dilution means for controlling the vapor pressure of the refrigerant in the evaporator; and said condensate dilution means comprises means for diluting the condensate with diluted refrigerant during periods of operation of said system when said refrigerant is diluted.

4. An absorption refrigeration system as defined in claim 1 including:
(A) vapor pressure control means for diluting the refrigerant in said evaporator to vary the vapor pressure thereof in response to an absorber ambient temperature condition; and
(B) said condensate dilution means comprising a liquid passage communicating with said condensate passage means and a location in said system containing refrigerant liquid for diluting said refrigerant condensate with diluted refrigerant during periods of operation of said system when said refrigerant is diluted.

5. An absorbent refrigeration system as defined in claim 1 including:
(A) vapor pressure control passage means for diluting the refrigerant liquid with absorbent solution; and
(B) said condensate dilution means comprising a liquid passage for mixing diluted refrigerant liquid with said condensate during periods of operation of said system when the refrigerant in the evaporator is diluted with absorbent solution.

6. An absorption refrigeration system as defined in claim 1 including:
(A) said evaporator comprising an adiabatic evaporator for evaporating a portion of the refrigerant therein to cool the remaining refrigerant;
(B) a heat absorbing heat exchanger for passing liquid refrigerant in heat exchange relation with a refrigeration load;
(C) refrigerant passage means for passing cooled liquid refrigerant from said adiabatic evaporator to said heat absorbing heat exchanger in heat exchange relation with said refrigeration load, and for returning the liquid refrigerant from said heat absorbing heat exchanger to said adiabatic evaporator;
(D) vapor pressure control means for diluting the refrigerant to vary the vapor pressure thereof in response to absorber ambient temperature conditions; and
(E) said condensate dilution means comprising a liquid passage extending between said refrigerant passage means, said condensate passage means for diluting the refrigerant condensate passing to said evaporator with liquid refrigerant during periods of operation of said system when said liquid refrigerant is diluted with absorbent solution.

7. An absorption refrigeration system as defined in claim 1 including:
(A) said evaporator comprising an adiabatic evaporator for evaporating a portion of the refrigerant therein to cool the remaining refrigerant;
(B) a heat absorbing heat exchanger for passing liquid refrigerant in heat exchange relation with a refrigeration load;
(C) refrigerant passage means for passing cooled refrigerant liquid from said adiabatic evaporator to said heat absorbing heat exchanger in heat exchange relation with said refrigeration load, and for returning liquid refrigerant from said heat absorbing heat exchanger to said adiabatic evaporator;
(D) vapor pressure control means for diluting the refrigerant to vary the vapor pressure thereof in response to absorber ambient temperature conditions;
(E) said condenser having a liquid condensate header; and
(F) said condensate dilution means comprising a liquid passage extending between said liquid condensate header of said condenser and said refrigerant passage, for diluting the refrigerant condensate passing to said evaporator during periods of operation of said system when the refrigerant is in said abiatic evaporator is diluted.

8. A method of operating an absorption refrigeration system, said system having a generator, a condenser, an evaporator and an absorber; said method comprising:
(A) boiling weak absorbent solution in the generator, to concentrate the solution and form refrigerant vapor;
(B) condensing refrigerant vapor in the condenser which was formed in the generator, to form concentrated refrigerant;
(C) evaporating liquid refrigerant in the evaporator to provide cooling;
(D) absorbing refrigerant vapor in the absorber which was formed in the evaporator into strong absorbent solution formed in the generator;
(E) passing refrigerant condensate from the condenser to the evaporator for evaporation therein; and
(F) varying the composition of the refrigerant condensate passing to the evaporator from the condenser at a point between the condenser and the evaporator prior to discharging the condensate into the evaporator in accordance with a condition of operation of said system.

9. A method of operating an absorption refrigeration system as defined in claim 8 wherein the step of varying the composition of the refrigerant condensate passing to the evaporator comprises diluting the refrigerant condensate with absorbent solution.

10. A method of operating an absorption refrigeration system as defined in claim 8 including the step of also controlling the vapor pressure of the refrigerant in the evaporator by varying the composition of the refrigerant therein in accordance with a condition of operation of said system.

11. A method of operating an absorption refrigeration system as defined in claim 8 wherein the step of varying the composition of the refrigerant condensate passing to the evaporator comprises:
(A) controlling the vapor pressure of the refrigerant in the evaporator by varying the composition of the refrigerant therein in accordance with a condition of operation of said system; and
(B) mixing liquid refrigerant with the refrigerant condensate passing to the evaporator during at least periods of operation of said system when the composition of the refrigerant in said evaporator has been changed from pure refrigerant.

12. A method of operating an absorption refrigeration system as defined in claim 8 including the step of controlling the vapor pressure of refrigerant in the evaporator by diluting said refrigerant with absorbent solution; and the step of varying the composition of refrigerant condensate passing to the evaporator comprises mixing diluted liquid refrigerant with the refrigerant condensate passing to the evaporator.

References Cited

UNITED STATES PATENTS

| | | | |
|---|---|---|---|
| 2,818,234 | 12/1957 | Berry | 165—62 |
| 3,124,938 | 3/1964 | Leonard, Jr. | 62—109X |
| 3,263,437 | 8/1966 | Aronson | 62—141X |
| 3,452,552 | 7/1969 | Johnson | 62—141 |

WILLIAM E. WAYNER, Primary Examiner

UNITED STATES PATENT OFFICE
CERTIFICATE OF CORRECTION

Patent No. 3,555,840   Dated January 19, 1971

Inventor(s) LOUIS H. LEONARD, JR.

It is certified that error appears in the above-identified patent and that said Letters Patent are hereby corrected as shown below:

Column 3, line 50, "14" should read --44--

Column 4, line 49, "concentration" should read --reconcentration--

Column 4, line 75, "different" should read --difference--

Column 8, line 27, Claim 7, "abiatic" should read --adiabatic--

Signed and sealed this 28th day of March 1972.

(SEAL)
Attest:

EDWARD M. FLETCHER, JR.
Attesting Officer

ROBERT GOTTSCHALK
Commissioner of Patents